United States Patent [19]
Maeda et al.

[11] Patent Number: 5,880,234
[45] Date of Patent: Mar. 9, 1999

[54] CURABLE FLUORINE-CONTAINING COPOLYMER AND COATING LIQUID COMPOSITION CONTAINING SAME

[75] Inventors: Kazuhiko Maeda, Tokyo; Yukio Ikeda, Saitama; Kentaro Tsutsumi, Saitama; Yutaka Maruyama, Yamaguchi; Shuyo Akama; Michitaka Ohtani, both of Saitama, all of Japan

[73] Assignee: Central Glass Company, Limited, Yamaguchi, Japan

[21] Appl. No.: 831,305

[22] Filed: Apr. 1, 1997

[30] Foreign Application Priority Data

Apr. 1, 1996 [JP] Japan .................................. 8-078801
Jun. 7, 1996 [JP] Japan .................................. 8-145824

[51] Int. Cl.$^6$ ................................................ C08F 12/22
[52] U.S. Cl. .......................................... 526/244; 525/254
[58] Field of Search .............................. 526/244; 255/254

[56] References Cited

U.S. PATENT DOCUMENTS 3,240,757  3/1966  Sterling .
4,631,326  12/1986  Koishi et al. .
5,053,470  10/1991  Wu .

FOREIGN PATENT DOCUMENTS 0135257  8/1984  Japan ...................................... 526/244

*Primary Examiner*—Bernard Lipman
*Assistant Examiner*—N. Sarofim

*Attorney, Agent, or Firm*—Evenson, McKeown, Edwards & Lenahan, P.L.L.C.

[57] ABSTRACT

The invention relates to a curable fluorine-containing copolymer prepared by copolymerizing a monomer mixture. This monomer mixture is in an amount of 100 mol % in total and includes (a) 10–60 mol % of a first polymerizable monomer that is one of hexafluoroisobutene and hexafluoroacetone, each of which has one hexafluoroisopropylidene group; (b) 10–70 mol % of a fatty acid vinyl ester that is represented by a general formula of $CH_2=CH-OC(=O)-R^1$ where $R^1$ is one of an alkyl group and $-(CH_2)_m-R^2-(CH_2)_n-H$ where $R^2$ is one of a cycloalkylene group and a divalent aromatic group, and m and n are respectively integers each ranging from 0 to 12, the alkyl group having a carbon atom number of from 1 to 22 and an optional branched chain, each of the cycloalkylene group and the divalent aromatic group having an optional substituent; (c) 1–60 mol % of a second polymerizable monomer that has a cross-linkable functional group and a polymerizable double bond, the cross-linkable functional group being one selected from the group consisting of hydroxyl group, carboxyl group, hydrolyzable organosilyl groups, epoxy groups, β-ketoester groups; and (d) 0–20 mol %, of a third polymerizable monomer that is different from the first and second monomers and the fatty acid vinyl ester and is free of a cross-linkable functional group. A coated film prepared by the application of a varnish containing the fluorine-containing copolymer is superior in water repellency and stain resistance.

25 Claims, No Drawings

CURABLE FLUORINE-CONTAINING COPOLYMER AND COATING LIQUID COMPOSITION CONTAINING SAME

BACKGROUND OF THE INVENTION

The present invention relates to a curable fluorine-containing copolymer and a coating liquid composition containing the copolymer.

Hitherto, various fluororesin-containing paints have been produced in an industrial scale, because of fluororesin's superior weather resistance. For example, there have been proposed curable solvent-thinned fluorine-containing copolymers (see Japanese Patent Unexamined Publication Nos. JP-A-57-34107 and JP-A-61-57609). These copolymers have been used for weather resistant paints in various fields such as architecture, automobile, and chemical industries. These copolymers are prepared by copolymerizing main fluorine-containing monomers (e.g., chlorotrifluoroethylene (CTFE), tetrafluoroethylene (TFE), and vinylidene fluoride) with other hydrocarbon monomers (e.g., vinyl esters and vinyl ethers) for increasing the copolymers in solubility. There have also been developed copolymers containing other fluorine-containing monomers. For example, hexafluoroisobutene (HFIB) and hexafluoroacetone (HFA), each of which has one hexafluoroisopropylidene group in the molecule, are known as being able to copolymerize with various other monomers. Thus, it is known that fluorine-containing copolymers prepared by using HFIB and HFA have characteristics that are different from other conventional copolymers prepared by using CTFE and the like. U.S. Pat. No. 3,240,757 discloses that a copolymer of HFIB and another monomer such as vinyl propionate or ethyl acrylate, and a terpolymer of HFIB, vinyl propionate and ethyl acrylate can respectively be dissolved in carbon tetrachloride and toluene. This patent further discloses that a terpolymer of HFIB, vinyl propionate and ethyl vinyl ether can not be dissolved in carbon tetrachloride, methyl ethyl ketone, and toluene, respectively. U.S. Pat. No. 5,053,470 discloses a first copolymer of HFIB and a vinyl ester and a second copolymer having a unit of —$CH_2$—CHOH—. It is disclosed therein that coating liquid compositions of these copolymers can provide a coated film that has a superior adhesion to substrate and a superior abrasion resistance, in addition to superior characteristics inherent in fluororesin film. JP-A-60-147415 discloses a coating liquid composition of a copolymer and a curing agent. This copolymer contains 43.0–48.8 mol % of a first structural unit originating from vinyl fluoride, 44.3–49.7 mol % of a second structural unit originating from HFIB, and 4.5–10.4 mol % of a third structural unit originating from hydroxybutyl vinyl ether, glycidyl vinyl ether or an unsaturated alcohol. JP-A-63-218715 discloses another copolymer prepared by copolymerizing 30 mol % of TFE, 20 mol % of HFIB, cyclohexylperfluorovinyl ether, ethyl vinyl ether, and hydroxybutyl vinyl ether. JP-A-64-60616 discloses still another copolymer prepared by copolymerizing 35 mol % of TFE, 15 mol % of HFIB, methyl-2-propenyl ether, chloroethyl vinyl ether, and hydroxybutyl vinyl ether JP-A-8-120213 discloses a further copolymer prepared by copolymerizing 41 mol % of CTFE, 5 mol % of HFIB, a vinyl ester, a hydroxybutylallyl ether, glycerol monoallyl ether, and triethoxyvinylsilane.

Conventional solvent-thinned fluororesin coating compositions of the above-mentioned fluorine-containing copolymers can provide coated films that are superior in weather resistance. These coated films are, however, inferior in stain resistance. In other words, the external appearance of these coated films may be damaged by stains in the form of streaks. In particular, a coated film prepared by using a polyvinylidene fluoride (PVDF) based copolymer is inferior in stain resistance. In order to solve this problem, there is a proposal of increasing the surface hardness of a coated film by increasing the glass transition point of a fluorine-containing copolymer A coated film having the thus increased surface hardness shows good results in the stain resistance test using carbon black or Magic Marker (trade name). Such coated film is, however, still easily stained in the actual exposure test. There is another proposal of adding an additive of metal alkoxide such as alkylsilicate to a fluorine-containing copolymer. With this, the contact angle of water drop on the coated film decreases, and thus the coated film may have rain streaks less than those of coated films prepared by using other conventional coating liquid compositions. In other words, the coated film according to this proposal is improved in stain resistance by increasing its hydrophilcity. It is, however, not preferable to use this coated film for automobile, because the automobile's coated film requires high hydrophobicity. Furthermore, it has been difficult to prepare a coated film that is superior in stain resistance and other characteristics such as recoatability and defoamability, by adding an additive to a fluorine-containing copolymer, as mentioned in the above proposal.

SUMMARY OF THE INVENTION

It is therefore an object of the present invention to provide a fluorine-containing copolymer that is able to provide a coated film with superior stain resistance, without adding a particular additive to the copolymer.

It is another object of the present invention to provide a fluorine-containing copolymer that is able to provide a coated film with superior hydrophobicity and superior stain resistance.

It is still another object of the present invention to provide a fluorine-containing coating composition containing such copolymer.

According to the present invention, there is provided a curable fluorine-containing copolymer prepared by copolymerizing a monomer mixture. This monomer mixture is in an amount of 100 mol % in total and comprises:

(a) 10–60 mol % of a first polymerizable monomer that is one of hexafluoroisobutene and hexafluoroacetone, each of which has one hexafluoroisopropylidene group;

(b) 10–70 mol % of a fatty acid vinyl ester that is represented by a general formula of $CH_2$=CH—OC(=O) —$R^1$ where $R^1$ is one of an alkyl group and —$(CH_2)_m$—$R^2$—$(CH_2)_n$—H where $R^2$ is one of a cycloalkylene group and a divalent aromatic group, and m and n are respectively integers each ranging from 0 to 12, said alkyl group having a carbon atom number of from 1 to 22 and an optional branched chain, each of said cycloalkylene group and said divalent aromatic group having an optional substituent;

(c) 1–60 mol % of a second polymerizable monomer that has a cross-linkable functional group and a polymerizable double bond, said cross-linkable functional group being one selected from the group consisting of hydroxyl group, carboxyl group, hydrolyzable organosilyl groups, epoxy groups, and β-ketoester groups; and (d) 0–20 mol % of a third polymerizable monomer that is different from said first and second monomers and said fatty acid vinyl ester and is free of a cross-linkable functional group.

According to the present invention, the first polymerizable monomer has one hexafluoroisopropylidene group in the molecule. In other words, the first monomer has two trifluoromethyl groups bonded to the same single carbon atom of α-position in the molecule. The use of such first monomer provides a coated film with high stain resistance. Furthermore, a fluorine-containing copolymer according to the present invention is provided with the cross-link property (i.e., the cross-link positions) by the use of the second polymerizable monomer having the above-mentioned cross-linkable functional group. Furthermore, polymerizability between the first monomer and the second monomer can substantially be increased by the use of the above fatty acid vinyl ester. The present inventors have unexpectedly found that such copolymer provides a coated film with far high stain resistance, in addition to high hydrophobicity (i.e., water repellency), as demonstrated by the after-mentioned Examples. Thus, a fluorine-containing copolymer according to the present invention can be used for buildings and the like, which require high stain resistance, and for automobiles, displays and the like, which require both of high stain resistance and high water repellency.

DESCRIPTION OF THE PREFERRED EMBODIMENTS

In the invention, the first polymerizable monomer is in an amount of from 10 to 60 mol %, preferably of from 20 to 55 mol %, more preferably of from 35 to 55 mol %, based on the total number of moles of the monomer mixture. If it is less than 10 mol %, the coated film becomes inferior in weather resistance. If it is greater than 60 mol %, the fluorine-containing copolymer becomes too low in solubility in solvent. As stated above, the first monomer has in the molecule one hexafluoroisopropylidene group, that is, two trifluoromethyl groups bonded to the same single carbon atom. Due to the existence of the hexafluoroisopropylilene group in the main chain of the fluorine-containing copolymer, this copolymer becomes substantially low in surface energy and refractive index and substantially high in water- and oil-repellencies. Thus, it is assumed that the copolymer of the present invention becomes much higher in stain resistance, as compared with other conventional copolymers prepared by using monomers each having in the molecule $CF_2$ unit(s), such as CTFE and TFE, or monomers each having only one $CF_3$ unit in the main chain thereof, such as hexafluoropropene (HFP).

As stated above, the fatty acid vinyl ester of the invention increases polymerizability between the first and second monomers. Besides this function, the fatty acid vinyl ester increases the copolymer in solubility, softness, fluidity and the like. If the fatty acid vinyl ester is omitted, it becomes difficult to introduce the second monomer into the copolymer. In the invention, the fatty acid vinyl ester is in an amount of from 10 to 70 mol %, preferably of from 10 to 60 mol %. If it is less than 10 mol %, the copolymer becomes insufficient in solubility. If it is greater than 70 mol %, the coated film becomes inferior in weather resistance. In the invention, nonlimitative examples of the fatty acid vinyl ester are vinyl acetate, vinyl propionate, vinyl butyrate, vinyl isobutyrate, vinyl caproate, vinyl isocaproate, vinyl pivalate, vinyl caprylate, vinyl caproylate, vinyl stearate, neononanoic acid ethenyl ester, neodecanoic acid ethenyl ester, vinyl cyclohexanate, vinyl benzoate, vinyl p-toluylate, and vinyl p-tert-butylbenzoate. As commercial products of neononanoic acid ethenyl ester and neodecanoic acid ethenyl ester, VEOVA-9 (V-9) and VEOVA-10 (V-10) made by Showa-Shell Chem. Co. can be cited, respectively. It is preferable to use the fatty acid vinyl ester having a molecular weight less than 130, because this vinyl ester is superior in copolymerizability and increases solubility of the copolymer. Nonlimitative examples of the fatty acid vinyl ester of this type are vinyl acetate, vinyl propionate, vinyl butyrate, vinyl isobutyrate, vinyl caproate, vinyl isocaproate, and vinyl pivalate. In particular, when the fatty acid vinyl ester of this type is used in the invention under a condition that the first monomer is in an amount of at least 35 mol %, the above-mentioned advantages of using the same become more conspicuous. If the fatty acid vinyl ester has a molecular weight of not less than 130, the fluorine-containing copolymer may become too low in solubility.

As stated above, the second polymerizable monomer has a polymerizable double bond and a cross-linkable functional group that is one selected from hydroxyl group, carboxyl group, hydrolyzable organosilyl groups, epoxy groups, and β-ketoester groups. This cross-linkable functional group is able to become cross-link positions or points, when the copolymer cross-links. Nonlimitative examples of the second monomer are allyl ethers, vinyl ethers, crotonic acid modified compounds, (meth)acrylates, unsaturated carboxylic acids, vinyl esters, and unsaturated dicarboxylic acid monoesters.

The second monomer having hydroxyl group in the molecule may be represented by the following general formula (1):

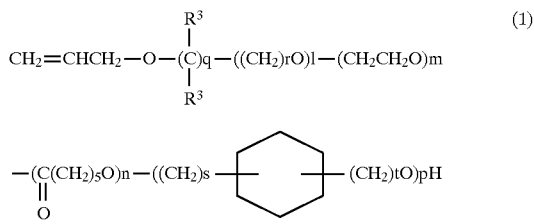

where $R^3$ represents the same or different alkyl groups each having a hydrogen or carbon atom number of from 1 to 3; l, p, q, s and t are integers each being 0 or 1; and r, m and n are integers each ranging from 0 to 12. Examples of the second monomer represented by the general formula (1) are alkylene glycol monoally ethers such as ethylene glycol monoally ether, propylene glycol monoallyl ether, diethylene glycol monoally ether, polyethylene glycol monoally ether and hydroxybutyl allyl ether; and allyl ethers of polyhydric alcohol, such as allyl alcohol and glycerol monoallyl ether. Furthermore, the second monomer having hydroxyl group in the molecule may be represented by the following general formula (2):

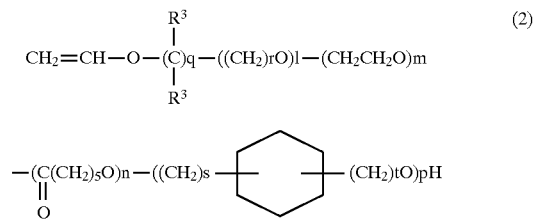

where $R^3$, l, p, q, s, t, r, m and n are respectively defined as in the general formula (1). Examples of the second monomer represented by the general formula (2) are hydroxymethyl vinyl ether, hydroxyethyl vinyl ether, 3-hydroxypropyl vinyl ether, 4-hydroxybutyl vinyl ether, 5-hydroxypentyl vinyl ether, 6-hydroxyhexyl vinyl ether, 1,4-cyclohexane dimethanol vinyl ether, and diethylene glycol monovinyl ether. Furthermore, the second monomer having hydroxyl group in the molecule may be represented by a formula of CH(—CH$_3$)=CHCOO—(CH$_2$)$_p$—OH where p is an integer ranging from 2 to 10. Examples of the second monomer represented by this formula are crotonic acid modified compounds such as hydroxyethyl crotonate and hydroxybutyl crotonate. Furthermore, the second monomer having hydroxyl group in the molecule may be represented by the following general formula (3):

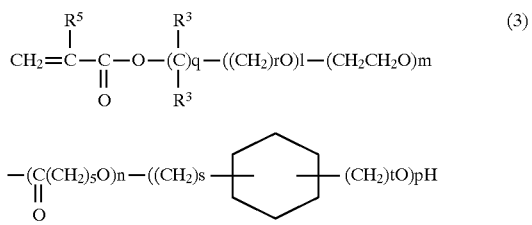

where $R^5$ is hydrogen atom or methyl group, and $R^3$ l, p, q, s, t, r, m and n are respectively defined as in the general formula (1). Examples of the second monomer represented by the general formula (3) are hydroxymethyl (meth) acrylate, hydroxyethyl (meth)acrylate, hydroxypropyl (meth)acrylate, hydroxybutyl (meth)acrylate, and polycaprolactone (meth)acrylate. When the first monomer is in an amount of at least 35 mol %, preferable examples of the second monomer are hydroxyalkyl acrylates each having a carbon atom number of from 1 to 10, such as hydroxyethyl acrylate, hydroxypropyl acrylate, and hydroxybutyl acrylate. In the invention, a special glycerol monoallyl ether, which has two hydroxyl groups in the molecule, is preferably used as the second monomer. The reason is that this glycerol monoallyl ether can decrease the number of moles of the second monomer which is necessary for providing the fluorine-containing copolymer with a certain predetermined hydroxyl value, relative to another glycerol monoallyl ether having only one hydroxyl group in the molecule. With the use of the above special glycerol monoallyl ether, the fluorine-containing copolymer becomes high in solubility in solvent, even if the first monomer is in an amount of not less than 35 mol %.

In the invention, the second monomer having carboxylic group in the molecule is not particularly limited. Its nonlimitative examples are unsaturated carboxylic acids and unsaturated dicarboxylic acid monoesters, such as acrylic acid (AA), methacrylic acid, crotonic acid, vinylacetic acid, undecylenic acid, maleic acid, maleic anhydride, itaconic acid, itaconic anhydride, fumaric acid, monoalkyl maleate, monoalkyl itaconate, monoalkyl succinate, monoallyl adipate, monoallyl sebacate, monoally cyclohexanedicarboxylate, monovinyl succinate, monovinyl adipate, monovinyl sebacate, and monovinyl cyclohexanecarboxylate.

In the invention, the second monomer having an hydrolyzable organosilyl group in the molecule may be a vinyl compound represented by a formula of CH$_2$=CH—Si(R$^4$)$_3$ where $R^4$ is selected from alkyl group; alkoxy group, cycloalkyl group and aromatic group, and at least one of three of $R^4$ is alkoxy group. In this formula, each of all these groups has a carbon atom number of from 1 to 22, each of the alkyl and alkoxy groups has an optional branched chain, and each of the cycloalkyl and aromatic groups has an optional substituent or a compound having another polymerizable group. It is preferable that the second monomer has a terminal olefinic unsaturated bond. Nonlimitative examples of this hydrolyzable group are alkoxy groups such as methoxy, ethoxy, propoxy, isopropoxy and butoxy; alkoxyalkoxy groups such as methoxyethoxy; acyloxy groups such as formyloxy, acetoxy, and propionoxy; and halogens (i.e., fluorine, chlorine, bromine, and iodine). Nonlimitative examples of the second monomer having alkoxysilyl group in the molecule are methacryloxymethyltrimethoxysilane, 3-acryloxypropyltrimethoxysilane, 3-acryloxypropylmethyldimethoxysilane, 3-methacryloxypropylmethyldimethoxysilane, 3-methacryloxypropyltrimethoxysilane, vinylmethyldiethoxysilane, vinyltrimethoxysilane, vinylmethyltris(2-methoxyethoxy)silane, vinyltriacetoxysilane, vinyltrimethylsilane, vinylmethyldichlorosilane, vinyltrichlorosilane, and alkoxysilyl-containing meth(acrylic) acid esters.

In the invention, the second polymerizable monomer may have in the molecule an epoxy group as a cross-linkable functional group. The second monomer of this type has a polymerizable group and another optional group for bonding the epoxy and polymerizable groups together. Nonlimitative examples of the polymerizable group are represented by formulas of CH$_2$=C(—R$^5$)—COO—(CH$_2$)$_n$—, CH(CH$_3$)=CH—COO—, CH$_2$=C(—R$^5$)—PH, CH$_2$=C(—R$^5$)C(=O)C—, CH$_2$=C(—R$^5$)C(=O)N—, CH$_2$=CHCH$_2$—O—, CH$_2$=CHO—, and CH$_2$=CH—, where —R$^5$ and n are defined as above, and PH is p-phenylene group. Nonlimitative examples of the epoxy group are those represented by the following structural formulas A, B, D, E and G:

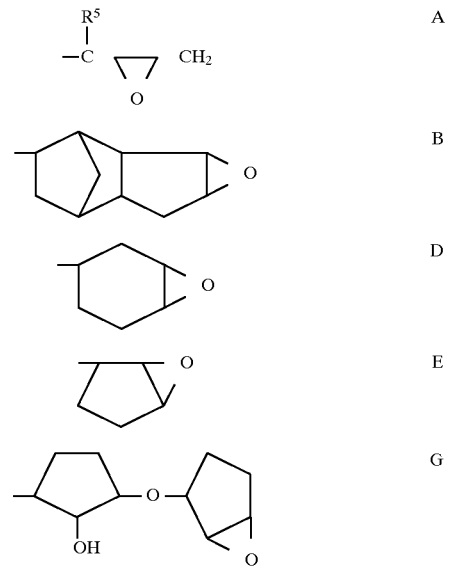

where $R^5$ is defined as above. Nonlimitative examples of the above-mentioned another optional group of the second monomer are alkylene and oxyalkylene groups, each having a carbon atom number of from 1 to 22, an optional single bond(s) and a branched chain, and divalent organic groups represented by the following structural formulas:

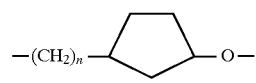

-continued

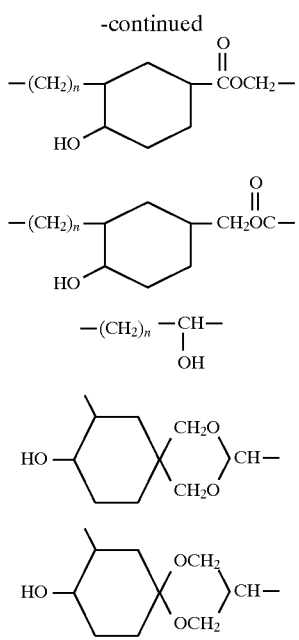

where n is defined as above.

Nonlimitative examples of the second monomer having epoxy group and the above-mentioned polymerizable unsaturated group of $CH_2=C(-R^5)-COO-(CH_2)_n-$ are those represented by the following general formulas of $CH_2=C(-R^5)-COO-(CH_2)_n-A$, $CH_2=C(-R^5)-COO-(CH_2)_n-B$, $CH_2=C(-R^5)-COO-(CH_2)_n-O-B$, $CH_2=C(-R^5)-COO-(CH_2)_n-D$, $CH_2=C(-R^5)-COO-(CH_2)_n-E$ and $CH_2=C(-R^5)-COO-(CH_2)_n-G$, and represented by the following structural formulas of:

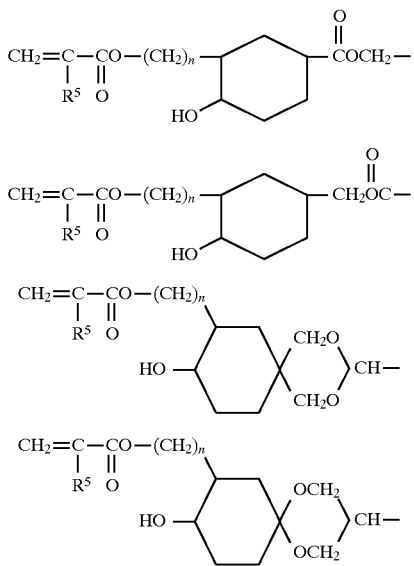

where $R^5$ and n are defined as above More concrete examples of the second monomer having epoxy group and the above-mentioned polymerizable unsaturated group of $CH_2=C(-R^5)-COO-(CH_2)_n-$ are those represented by the following formulas of $CH_2=C(-CH_3)-COO-CH_2-A$ where $R^5$ of A is hydrogen, $CH_2=C(-CH_3)-COO-CH_2-A$ where $R^5$ of A is methyl group, $CH_2=CH-COO-CH_2-A$ where $R^5$ of A is hydrogen, $CH_2=CH-COO-CH_2-A$ where $R^5$ of A is methyl group, $CH_2=CH-COO-B$, $CH_2=CH-COO-(CH_2)_3-B$, $CH_2=C(-CH_3)-COO-CH_2-D$, $CH_2=CH-COO-CH_2-D$, $CH_2=CH-COO-(CH_2)_2-E$ and $CH_2=C(-CH_3)-COO-(CH_2)_2-G$, and represented by the following structural formulas of:

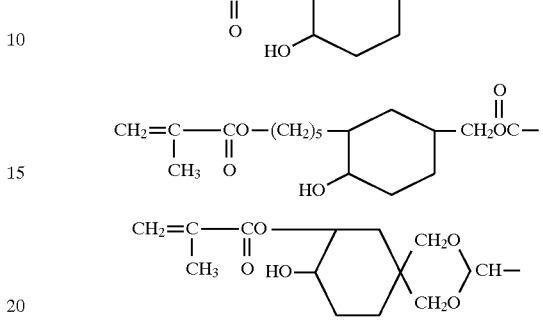

Nonlimitative examples of the second monomer having epoxy group and the above-mentioned polymerizable unsaturated group of $CH_2=C(-R^5)C(=O)C-$ are those represented by the following general formulas of $CH_2=C(-R^5)C(=O)C-(CH_2)_n-A$, $CH_2=C(-R^5)C(=O)C-(CH_2)_n-B$, and $CH_2=C(-R^5)C(=O)C-(CH_2)_n-D$, where $R^5$ and n are defied as above. More concrete examples of the second monomer of this type are $CH_2=CH-C(=O)C-(CH_2)_2-A$ where $R^5$ of A is hydrogen, $CH_2=C(-CH_3)C(=O)C-(CH_2)_2-B$, and $CH_2=C(-CH_3)C(=O)C-(CH_2)_3-D$.

Nonlimitative examples of the second monomer having epoxy group and the above-mentioned polymerizable unsaturated group of $CH_2=CHCH_2-O-$ are those represented by the following general formulas of $CH_2=CHCH_2-O-(CH_2)_n-A$, $CH_2=CHCH_2-O-(CH_2)_n-B$, $CH_2=CHCH_2-O-(CH_2)_n-D$, and $CH_2=CHCH_2-O-(CH_2)_n-CH(-OH)-D$, where $R^5$ and n are defined as above. More concrete examples of the second monomer of this type are $CH_2=CHCH_2-O-CH_2-A$ where $R^5$ of A is hydrogen, $CH_2=CHCH_2-O-CH_2-A$ where $R^5$ of A is methyl group, $CH_2=CHCH_2-O-(CH_2)_2-B$, $CH_2=CHCH_2-O-(CH_2)_2-D$, and $CH_2=CHCH_2-O-CH_2-CH(-OH)-D$.

Nonlimitative examples of the second monomer having epoxy group and the above-mentioned polymerizable unsaturated group of $CH_2=CH-O-$ are those represented by the following general formulas of $CH_2=CH-O-(CH_2)_n-A$, $CH_2=CH-O-(CH_2)_n-B$, and $CH_2=CH-O-(CH_2)_n-D$, where $R^5$ and n are defined as above. More concrete examples of the second monomer of this type are $CH_2=CH-O-(CH_2)_3-A$ where $R^5$ of A is hydrogen, $CH_2=CH-O-CH_2-B$, and $CH_2=CH-O-CH_2-D$.

Nonlimitative examples of the second monomer having epoxy group and the above-mentioned polymerizable unsaturated group of $CH_2=CH-$ are those represented by the following general formulas of $CH_2=CH-(CH_2)_n-A$, $CH_2=CH-(CH_2)_n-B$, and $CH_2=CH-(CH_2)_n-D$, where $R^5$ and n are defined as above. More concrete examples of the second monomer of this type are $CH_2=CH-(CH_2)_3-A$ where $R^5$ in A is hydrogen, $CH_2=CH-CH_2-B$, and $CH_2=CH-CH_2-D$.

Nonlimitative examples of the second monomer having epoxy group and the above-mentioned polymerizable unsaturated group of $CH_2=C(-R^5)-PH-$ are those represented by the following general formulas of $CH_2=C(-R^5)-PH-(CH_2)_n-A$, $CH_2=C(-R^5)-PH-(CH_2)_n-B$, $CH_2=C(-R^5)-PH-O-(CH_2)_n-D$, $CH_2=C(-R^5)-PH-(CH_2)_n-D$, and $CH_2=C(-R^5)-PH-(CH_2)_n-NH-C(=O)-(CH_2)_n-D$ where $R^5$, n and PH are defined as above. More concrete examples of the second monomer of this type are $CH_2=C(-CH_3)-PH-O-CH_2-A$, $CH_2=CH-PH-CH_2-B$, $CH_2=CH-PH-O-CH_2-D$, $CH_2=C(-CH_3)-PH-(CH_2)_2-D$, $CH_2=C(-CH_3)-PH-C(-CH_3)_2-NH-C(=O)-CH_2-D$, where $R^5$ of A is hydrogen, and PH is defined as above.

As stated above, the second monomer of the invention is in an amount of from 1 to 60 mol %, preferably of from 1 to 55 mol %. If it is less than 1 mol %, the degree of cross-link of the copolymer becomes insufficient. If it is greater than 60 mol %, the coated film tends to have cracks. Furthermore, a varnish of the copolymer becomes unstable during storage, and the copolymer becomes substantially lowered in solubilty.

In the invention, the second polymerizable monomer may be ε-caprolactone modified vinyl ether or ε-caprolactone modified allyl ether, such as PLACCEL (trade name) made by DAICEL CHEMICAL INDUSTRIES, LTD.

In the invention, the second polymerizable monomer may be a vinyl ether or allyl ether, each containing β-ketoester group and being represented by a general formula of $CH_2=CH-(CH_2)q-O-R^6-C(C=O)CH_2C(C=O)CH_3$ where q is 0 or 1, and $-R^6$ represents $-(R^7O)u-$ where $R^7$ is an alkylene group having a carbon atom number of from 2 to 4, and u is an integer ranging from 0 to 20. A preferable example of the second monomer of this type is allyl acetoacetate.

All of the above-mentioned compounds as examples of the second polymerizable monomer are polar compounds. It is assumed that the pigment dispersibility in the fluorine-containing coating composition tends to be lowered by the existence of the trifluromethyl groups of the first monomer. It is, however, further assumed that the second monomer, which has polarity, counteracts the trifluoromethyl groups to increase the pigment dispersibility therein. β-k-etoester group of the second monomer is cross-linkable in a solvent-thinned paint and an emulsion paint, respectively. In order to cross-link the β-ketoester group, it is preferable to use a metal alkoxide or a chelate hardener for a solvent-thinned paint, and a hydrazine compound for an emulsion paint.

In the invention, the fluorine-containing copolymer may contain 0–20 mol % of the optional third polymerizable monomer which is copolymerizable with the first and second monomers and the fatty acid vinyl ester. Examples of the third monomer are fluoroolefins, alkyl vinyl ethers, aryl vinyl ethers, alkyl allyl ethers, aryl allyl ethers, (meth) acrylic esters, and other general monomers. The fluoroolefin used as the third monomer has at least one fluorine atom substituted for at least one hydrogen atom of ethylene, and optionally has at least one substituent substituted for at least one of the other hydrogen atoms of the ethylene. The at least one substituent is selected from fluorine atom, chlorine atom, methyl group, fluoromethyl group, difluoromethyl group, trifluoromethyl group, and the like. Furthermore, the fluoroolefin is free of hexafluoroisopropylidene group which is contained in the first monomer. Nonlimitative examples of the fluoroolefin are CTFE, TFE, vinylidene fluoride, vinyl fluoride, and hexafluoropropene. When the fluoroolefin is used as the third monomer, the molar ratio of the first monomer to the fluoroolefin is adjusted to be at least 1.5. If this ratio is less than 1.5, the coated film of the fluorine-containing copolymer may not have high water repellency inherent in HFIB or hexafluoroacetone. The above-mentioned alkyl vinyl ethers and aryl vinyl ethers used as the third monomer are represented by a general formula of $CH_2=CH-O-R^1$ where $R^1$ is defined as above. Nonlimitative examples of these ethers are chain alkylvinyl ethers such as ethyl vinyl ether, propyl vinyl ether, isopropyl vinyl ether, butyl vinyl ether, tert-butyl vinyl ether, pentyl vinyl ether, hexyl vinyl ether, isohexyl vinyl ether, octyl vinyl ether, and 4-methyl-1-pentyl vinyl ether; cycloalkyl vinyl ethers such as cyclopentyl vinyl ether and cyclohexyl vinyl ether; and aryl vinyl ethers such as phenyl vinyl ether and tolyl vinyl ether. The above-mentioned alkyl allyl ethers and aryl allyl ethers are represented by a general formula of $CH_2=CHCH_2-O-R^1$ where $R^1$ is defined as above. Nonlimitative examples of these ethers are ethyl allyl ether, butyl allyl ether, and cyclohexyl allyl ether. The above-mentioned (meth)acrylic esters are represented by a general formula of $CH_2=C(-R^5)-COO-R^1$ where $R^1$ and $R^5$ are defined as above. Nonlimitative examples of these esters are methyl (meth)acrylate, ethyl (meth)acrylate, propyl (meth)acrylate, n-butyl (meth)acrylate, isobutyl (meth)acrylate, tert-butyl (meth)acrylate, cyclohexyl (meth)acrylate, 2-ethylhexyl (meth)acrylate, n-octyl (meth)acrylate, isooctyl (meth) acrylate, nonyl (meth)acrylate, tridecyl (meth)acrylate, lauryl (meth)acrylate, and benzyl (meth)acrylate. Furthermore, the (meth)acxylate esters may be allyl (meth)acrylate and the like, each having an unsaturated alkyl group. Nonlimitative examples of the above-mentioned general monomers are aromatic vinyl compounds such as styrene, and α-olefins such as ethylene, propylene, butene-1, and isobutene.

In the invention, the fluorine-containing copolymer is prepared by copolymerizing the monomer mixture, in the presence of a polymerization medium, using a polymerization initiator. This copolymerization may be conducted by solution polymerization, suspension polymerization, or emulsion polymerization. In the invention a suitable polymerization initiator may be selected depending on the polymerization manner, the polymerization temperature, the type of the polymerization medium, and the like. As the polymerization initiator, there may be used common radical polymerization initiators, for example, dicarbonates such as diisopropyl peroxydicarbonate, di-n-propyl peroxycarbonate, and di-2-ethylhexyl peroxycarbonate; diacyl peroxides such as n-heptafluorobutyric peroxide, lauroyl peroxypivalate, and t-butyl oxyneodecanoate; alkyl peroxides such as di-t-butyl peroxide and t-butylcumyl peroxide; and peroxy esters such as t-butyl peroxyneodecanoate. Furthermore, water-soluble peroxides, persulfates, water-soluble azo compounds may be used. The polymerization temperature depends on the type of the radical polymerization initiator and may be in a range of from 0° to 130° C.

In the invention, the polymerization medium is not particularly limited as long as it does not interfere with the polymerization. Nonlimitative examples of the polymerization medium are water; alcohols such as t-butanol, isopropanol, ethanol, and methanol; saturated hydrocarbons such as n-hexane and n-heptane; aromatic hydrocarbons such as toluene and xylene; fluorine-containing compounds such as trichlorotrifluoroethane; ketones such as acetone, methyl ethyl ketone, and methyl isobutyl ketone; esters such as ethyl acetate and butyl acetate; and mixtures of at least two of these. It is preferable to use a low-boiling-point alcohol, particularly isopropanol, as the polymerization medium, because it can be easily replaced with another hydrocarbon solvent (e.g., xylene, toluene, ethyl acetate, butyl acetate, or propylene glycol methylacetate) after the polymerization.

If an alcohol solvent is used as the polymerization medium, the radical chain transfer is assumed to occur during the polymerization. With this, the alcohol is assumed to be bonded to the terminal of the fluorine-containing copolymer, thereby to introduce hydroxyl group into the terminal thereof. This hydroxyl group at the terminal has a very important function to increase strength of the coated film after the cross-link. Furthermore, the copolymer is lowered in molecular weight by the effect of the chain transfer. This copolymer may be dissolved in solvent, even if its fluorine content is high. Thus, the copolymer prepared by using a solvent containing alcohol may hare a structure that is different from that of the copolymer prepared by not using the same. For example, when the copolymer is prepared by solution polymerization in a solvent containing at least 40 wt % of alcohol solvent, it is possible to obtain a fluorine-containing copolymer having a molecular weight of up to 8,000 and a hydroxyl value of at least 40 mg KOH/g. This copolymer is suitably used for a paint.

In the invention, the fluorine-containing copolymer is not particularly limited in molecular weight. Its number average molecular weight may be in a range of from about 1,000 to about 500,000 (polystyrene as a standard material in gel permeation chromatography (GPC)). If the coating composition containing the copolymer is in the form of liquid, the molecular weight of the copolymer is preferably in a range of from about 1,000 to about 50,000, more preferably of from 1,000 to 8,000, from viewpoints of the coating composition's conditions such as viscosity and concentration, and the coated film's characteristics such as strength and weather resistance. If it is less than 1,000, the coated film may become inferior in weather resistance and softness. If it is greater than 50,000, the coating composition may become too high in viscosity. Furthermore, the copolymer may not sufficiently dissolved in the coating composition. If the coating composition is in the form of emulsion, the molecular weight is preferably in a range of from 5,000 to 500,000 in order to obtain a coated film that is superior in strength and the like.

In the invention, the copolymerization may be conducted by radical emulsion polymerization, as stated above, using an emulsifying agent. This emulsifying agent may be an anion or nonion emulsifying agent. Examples of the anion emulsifying agent are alkylbenzenesulfonate, alkylsulfate, polyoxyethylenealkylphenolsulfate, styrenesulfonate, vinylsulfate, and derivatives of these. These salts may be produced by the interaction of the acids (e.g., alkylsulfuric acid) and bases (e.g., alkali metal hydroxides and volatile bases). Examples of the volatile bases are ammonia and triethylamine Examples of the above-mentioned nonion emulsifying agent are polyoxyethylenealkylphenolethers, polyoxyethylenealkylethers, polyoxyethylene higher fatty acid esters, ethyleneoxidepropyleneoxide block copolymers, fluoroalkylcarboxylates, and fluoroalkylsulfates. The radical polymerization initiator usable in the emulsion polymerization is not limited to a particular type, as long as it is usable in a common emulsion polymerization. A water-soluble initiator is particularly preferably used. Examples of the water-soluble initiator are inorganic peroxides such as hydrogen peroxide; organic peroxides such as cumene hydroperoxide, benzoyl peroxide, t-butyl hydroperoxide, disuccinic acid peroxide, and diglutaric acid peroxide; persulfates such as ammonium persulfate, potassium persulfate, and sodium persulfate; and azo-initiators such as hydrochloride of azobisisobutylamidine, azobisisobutyronitrile, and azobiscyanovaleric acid. Further examples of the water-soluble initiator are redox initiators which are combinations of the above-exemplified initiators and reducing agents such as sodium sulfite, sodium thiosulfate, sodium bisulfite, sodium metabisulfite, sodium bithiosulfate, formaldehyde sodium sulfoxylate, and reducing sugar. To the redox initiator, it is optional to add a small amount of iron, ferrous salt, silver sulfate, copper sulfate, and the like. In the invention, the radical polymerization initiator may be added at one time or several times.

In the preparation of the coating composition, it is optional to add other additives such as pigment, dye, ultraviolet absorbing agent, light stabilizer, rust preventive agent, dispersant, antisagging agent, coalescing agent, antifungus agent, and antifreezing agent. Furthermore, it is optional to add other resins such as fluorine-containing polyols, other fluororesins that contain alkoxysilyl group, acrylic silicone resins, acrylic polyols, polyvinyl esters, silicone compounds, polyalkylene glycols, and alkyd resins.

In the invention, the form of the coating composition is not particularly limited. For example, the coating composition may be in the form of a solvent-thinned paint that cross-links at ambient temperature or by baking, a water-based emulsion paint that cross-links at ambient temperature or by baking, a solvent-free paint that cross-links at ambient temperature or by baking, or a non-crosslinking type paint. The coating composition may be in the form of enamel or clear paint.

In the invention, the coating composition is not particularly limited in cross-king structure. For example, when the fluorine-containing copolymer contains hydroxyl group, carboxyl group or epoxy group, the cross-liking agent (hardener) can be selected from melamine resin hardeners, urea resin hardeners, polybasic acid hardeners, epoxy hardeners, and isocyanate hardeners. The amount of the cross-linking agent can be decided depending on the amount of the functional group contained in the fluorine-containing copolymer. Nonlimitative examples of the cross-linking agent (hardener) are isocyanates such as isophorone diisocyanate, hexamethylene diisocyanate, tolylene diisocyanate and diphenylmethane diisocyanate, isocyanurates, blocked isocyanates, biuret-containing polyisocyanates, epoxy hardeners each having at least two epoxy groups and being prepared by a reaction of a polyhydric phenol (e.g., bisphenol A) with epichlorohydrine, and amino resins such as urea resins and melamine resins (e.g., alkylated melamine, methylol melamine and imino melamine).

In the invention, when the fluorine-containing copolymer contains hydroxyl group ox carboxyl group, it is particularly preferable to use a hardener selected from polyisocyanate, blocked isocyanate and isocyanurate, which is derived from isophorone diisocyanate. The fluorine-containing copolymer of the invention is well compatible with this harder, and thus there can be obtained a cross-linked or cured film which is transparent and strong. Nonlimitative examples of commercial products of this hardener are DESMODUR Z4370, DESMODUR BL4165 and TPLS2094 of Sumitomo Bayer Urethane Co. and VESTANAT V1890E and B1358 of H üls Co.

In the invention, when the fluorine-containing copolymer contains epoxy group, it is preferable to add a solvent-soluble resin containing therein carboxyl group to the coating composition, besides a common epoxy hardener. This solvent-soluble resin is preferably a fluororesin, more preferably a fluorine-containing copolymer according to the invention having carboxyl group. In this case, the cross-linkable points of the fluorine-containing copolymer of the invention are cross-linked is with each other. With this cross-linking manner, the trifluoromethyl content of the coating composition is not lowered. Therefore, the coated film becomes superior in stain resistance, water repellency and the like.

The following nonlimitative examples 1–21 are illustrative of the present invention

EXAMPLE 1

In this example, a varnish containing a fluorine-containing copolymer according to the present invention was prepared as follows.

At first, a 2-liter stainless steel autoclave provided with an electromagnetic stirrer was charged with 246 g (30 mol %) of vinyl pivalate (VPv), 295 g (25 mol %) of neononanoic acid ethenyl ester (V-9), 32 g (5 mol %) of ethylene glycol monoallyl ether (EGMAE) 75 g (10 mol %) of hydroxybutyl vinyl ether (HBVE), 385 g of butyl acetate, and 9 g of t-butyl peroxy pivalate made by Nippon Oil & Fats Co. The gas atmosphere in the autoclave was replaced by nitrogen gas, and this operation was repeated three times. Then, 314 g (30 mol %) of hexafluoroisobutene (HFIB) was introduced into the autoclave. Then, the temperature in the autoclave was raised up to 55° C., and at this temperature polymerization reaction was carried out for 20 hr. The reaction liquid was taken out of the autoclave. Then, butyl acetate was added thereto to prepare a varnish by adjusting the concentration of the obtained fluorine-containing copolymer therein to 60 wt %.

The chemical composition and analytical results of the fluorine-containing copolymer (Copolymer E1) are shown in Table 1. The molecular weight shown in Tables 1 is the number average molecular weight (polystyrene as a standard material) determined by GPC. As to the results of solubility in Tables 1–2, "A" means that the fluorine-containing copolymer did not precipitate during the polymerization, and "B" means that it did. As to the polymerizability in Tables 1–2, "A" means that both of the degree of polymerization of the monomers and the yield of the copolymer were sufficiently high; and "B" means that both of them were not. In Tables 1, 2, 4 and 5, the amount of solvent is expressed in parts by weight, per 100 parts by weight of the total weight of the monomer mixture.

TABLE 1

| | Fluorine-containing Copolymers | | | | | | | | |
|---|---|---|---|---|---|---|---|---|---|
| | E1 | E2 | E3 | E4 | E5 | E6 | E7 | E8 | E9 |
| Charged Monomers (mol %) | | | | | | | | | |
| HFIB | 30.0 | 30.0 | 20.0 | 35.0 | 30.0 | 55.0 | — | — | 40.0 |
| HFA* | — | — | — | — | — | — | 45.0 | 40.0 | — |
| TFE* | — | — | 10.0 | — | — | — | — | 5.0 | — |
| CTFE* | — | 5.0 | — | — | 10.0 | — | — | — | — |
| Ethylene | — | — | — | — | 4.0 | — | — | 5.0 | — |
| VPv* | 30.0 | 30.0 | 20.0 | 49.0 | — | 40.0 | 40.0 | — | — |
| VBu* | — | — | — | — | 30.0 | — | — | 30.0 | 50.0 |
| V9 | 25.0 | 5.0 | 20.0 | — | — | — | — | — | — |
| EVE* | — | 5.0 | 7.0 | — | — | — | — | — | — |
| CHVE* | — | 2.0 | — | — | — | — | — | 10.0 | — |
| MMA* | — | — | 5.0 | — | — | — | — | — | — |
| AAA* | — | — | 5.0 | — | — | — | — | 3.0 | 5.0 |
| EGMAE | 5.0 | 15.0 | — | — | — | — | — | — | — |
| ε-CAE* | — | 5.0 | — | — | 5.0 | — | — | — | 5.0 |
| GMAE* | — | — | 5.0 | — | 10.0 | — | — | — | — |
| HBVE | 10.0 | — | 5.0 | — | — | — | — | — | — |
| HEA* | — | — | — | 15.0 | — | 5.0 | — | — | — |
| VAA* | — | 3.0 | — | 1.0 | — | — | — | — | — |
| Acrylic Acid | — | — | — | — | 1.0 | — | — | — | — |
| TMVS* | — | — | 3.0 | — | 10.0 | — | 15.0 | 7.0 | — |
| Solvent (parts by weight) | | | | | | | | | |
| Butyl Acetate | 40.0 | 60.0 | — | 20.0 | 30.0 | — | 40.0 | 50.0 | — |
| IPA* | — | — | 40.0 | 20.0 | — | 50.0 | — | — | — |
| Water | — | — | — | — | — | — | — | — | 60.0 |
| Copolymer Characteristics | | | | | | | | | |
| Solubility | A | A | A | A | A | A | A | A | — |
| Polymerizability | A | A | A | A | A | A | A | A | A |
| OH Value (mg KOH/g) | 52 | 80 | 75 | 85 | 120 | 48 | — | — | 25 |
| Acid Value (mg KOH/g) | — | 15 | — | 5 | 6 | — | — | — | — |
| Molecular Weight | 7800 | 7200 | 5200 | 4700 | 6900 | 3100 | 7900 | 7500 | 210,000 |

*HFA: hexafluoroacetone, TFE: tetrafluoroethylene, CTFE: chlorotrifluoroethylene, VBu: vinyl butyrate, EVE: ethyl vinyl ether, CHVE: cyclohexyl vinyl ether, MMA: methyl methacrylate, AAA: allyl acetoacetate, ε-CAE: ε-caprolactone-modified monoallyl ether, GMAE: glycerol monoallyl ether, HEA: hydroxyethyl acrylate, VAA: vinylacetic acid, TMVS: trimethoxyvinylsilane, and IPA: isopropyl alcohol.

EXAMPLES 2, 5, 7 AND 8

In these examples, Example 1 was repeated except that selective changes were made as shown in Table 1 in the kind and quantity of monomers for preparing the fluorine-containing copolymers E2, E5, E7 and E8, respectively.

EXAMPLES 3, 4, AND 6

In these examples 3, 4 and 6, Example 1 was repeated except that selective changes were made as shown in Table 1 in the kind and quantity of monomers for respectively preparing the fluorine-containing copolymers E3, E4 and E6 and that the preparation of the varnish was slightly modified as follows. That is, to 100 parts by weight of the obtained varnish taken out of the autoclave 60 parts by weight of butyl acetate was added. Then, isopropyl alcohol contained in the varnish was distilled off, using evaporator, thereby to obtain a varnish containing 60 wt % of the fluorine-containing copolymer. This varnish was used in the after-mentioned evaluation tests.

EXAMPLE 9

In this example, a water-based emulsion containing a fluorine-containing copolymer according to the present invention was prepared as follows.

At first, a 2-liter stainless steel autoclave provided with an electromagnetic stirrer was charged with 342 g (50 mol %) of vinyl butyrate, 42 g (5 mol %) of allyl acetoacetate, 52 g (5 mol %) of ε-caprolactone-modified monoallyl ether, 742 g of water, 0.7 g of potassium persulfate, 0.2 g of sodium carbonate decahydrate, and 10 g of nonion emulsifying agent, NEWCOL-504 (trade name) of Nippon Nyukazai Co. The gas atmosphere in the autoclave was replaced by nitrogen gas, and this operation was repeated three times. Then, 393 g (40 mol %) of hexafluoroisobutene (HFIB) was introduced into the autoclave. Then, the temperature in the autoclave was raised up to 50° C., and at this temperature polymerization reaction was carried out for 22 hr. The reaction liquid was taken out of the autoclave and then concentrated, thereby to obtain a water-based emulsion containing 48 wt % of the fluorine-containing copolymer (solid matter). The chemical composition and analytical results of the copolymer (Copolymer E9) are shown in Table 1.

COMPARATIVE EXAMPLES 1–3

In these comparative examples, Example 1 was repeated except that selective changes were made as shown in Table 2 in the kind and quantity of monomers for preparing the fluorine-containing copolymers CE1, CE2 and CE3, respectively.

In Comparative Example 1, the amount of HFIB was greater than the upper limit of the range (10–60 mol %) of the present invention, and the obtained reaction liquid taken out of the autoclave was cloudy in white color. This means that the obtained copolymer (CE1) is not soluble in solvent and thus is not suitably used for paint. Thus, solubility was evaluated as "B". In Comparative Example 2, the fatty acid vinyl ester was omitted. In Comparative Example 3, the amount of the first monomer (hexafluoroacetone) was greater than the upper limit of the range (10–60 mol %) of the present invention. As shown in Table 2, polymerizability of each of Comparative Examples 2–3 was inferior and thus evaluated as "B".

TABLE 2

| | Fluorine-containing Copolymers | | |
|---|---|---|---|
| | CE1 | CE2 | CE3 |
| Charged Monomers (mol %) | | | |
| HFIB | 65.0 | 30.0 | — |
| HFA* | — | — | 65.0 |
| VPv* | 20.0 | — | 25.0 |
| V9 | 5.0 | — | — |
| EVE* | — | 40.0 | — |
| CHVE* | — | 10.0 | — |
| MMA* | — | 10.0 | — |
| EGMAE | — | — | — |
| HBVE | 10.0 | — | — |
| HEA* | — | 10.0 | — |
| VAA* | — | — | — |
| TMVS* | — | — | 10.0 |
| Solvent (parts by weight) | | | |
| Butyl Acetate | 40.0 | — | 40.0 |
| IPA* | — | 40.0 | — |
| Water | — | — | — |
| Copolymer Characteristics | | | |
| Solubility | B | A | A |
| Polymerizability | A | B | B |

EVALUATION TESTS (1)

In each of Examples 1–9, the following evaluation tests were conducted on the paint and the coated film. The results are shown in Table 3.

The paint was prepared by adding a hardener(s) in an amount shown in Table 3, per 100 parts by weight of the fluorine-containing copolymer, to the varnish obtained in each of Examples 1–9. The thus obtained paint was applied to an aluminum plate having dimensions of 150 mm, 70 mm and 2 mm, with a spray gun, thereby to obtain thereon a coated film having a thickness of about 40 μm. The coated film was cured at a certain temperature for a certain period of time, as shown in Table 3, to prepare a test sample.

In the evaluation of paint compatibility, "A" means that a transparent liquid was obtained by adding a hardener to a varnish of the fluorine-containing copolymer and by subsequent stirring, and "B" means that an opaque liquid was obtained thereby.

In the solvent resistance test, a piece of cotton wool moistened with methyl ethyl ketone was rubbed against the coated film of the test sample until 100 reciprocations thereof. Then, the surface condition of the coated film was examined with the naked eye. As to the results, "A" means that the surface condition was not changed at all, and "B" means that scratches were formed on the coated film, or the coated film was dissolved.

In the water resistance test, the test sample was immersed in water at 50° C. for ten days. After that, the coated film's condition was examined with the naked eye. As to the results, "A" means that the coated film was not changed at all, and "B" means that there occurred blisters thereon, exfoliation thereof, or gloss change thereof.

The weather resistance test was conducted by accelerated testing with a sunshine weathermeter for 5,000 hr, and the surface gloss of each test sample at 60 degrees was measured before and after the weather resistance test to indicate the degree of weather resistance by percentage of the retained gloss.

In the contact angle test, the contact angle of a stationary water drop on the coated film was measured.

In the color difference determination test, the color of the test sample was measured before and after an outdoor exposure test for six months in accordance with Japanese Industrial Standard (JIS) Z8730. In this test, a portion of the sample which has no rain streaks thereon was used for the measurement after the exposure test. This outdoor exposure test was conducted in Kawagoe City, Saitama Prefecture, Japan.

ation Tests (1). Then, the coated film was cured at 25° C. for three days to prepare a test sample. This test sample was subjected to Evaluation Tests (1), except paint compatibility. As to the test results, solvent resistance was "A", water resistance was "A", weather resistance was 94%, the contact angle of water drop was 88 degrees, and the color difference was 12.4.

EXAMPLE 10

In this example, a varnish containing a fluorine-containing copolymer according to the present invention was prepared as follows.

At first, a 2-liter stainless steel autoclave provided with an electromagnetic stirrer was charged with 301.58 g (40 mol

TABLE 3

| | Test Samples | | | | | | | | |
|---|---|---|---|---|---|---|---|---|---|
| | 1 | 2 | 3 | 4 | 5 | 6 | 7 | 8 | 9 |
| Fluorine-containing Copolymers (parts by wt) | | | | | | | | | |
| E1 | 100 | — | — | — | — | — | — | — | — |
| E2 | — | 100 | — | — | — | — | — | — | — |
| E3 | — | — | 100 | — | — | — | — | — | — |
| E4 | — | — | — | 100 | — | — | — | — | — |
| E5 | — | — | — | — | 100 | — | — | — | — |
| E6 | — | — | — | — | — | 100 | — | — | — |
| E7 | — | — | — | — | — | — | 100 | — | — |
| E8 | — | — | — | — | — | — | — | 100 | — |
| E9 | — | — | — | — | — | — | — | — | 100 |
| Hardeners (parts by wt) | | | | | | | | | |
| HX* | 18 | — | 26 | — | — | — | — | — | — |
| V1890E* | — | 35 | — | 48 | — | — | — | — | — |
| VB1358A* | — | — | — | — | 98 | 38 | — | — | — |
| DBTDL* | 0.1 | 0.05 | — | 0.05 | 1 | 2 | 3 | 3 | — |
| ADH* | — | — | — | — | — | — | — | — | 5 |
| Cross-link Temp. (°C.) | 25 | 25 | 25 | 25 | 180 | 170 | 200 | 250 | 25 |
| Cross-link Time | 3 days | 3 days | 3 days | 3 days | 20 min | 20 min | 20 min | 3 min | 3 days |
| Paint Compatibility | A | A | A | A | A | A | A | A | — |
| Coated film Characteristics | | | | | | | | | |
| Solvent Res. | A | A | A | A | A | A | A | A | A |
| Water Res. | A | A | A | A | A | A | A | A | A |
| Weather Res. (%) | 98 | 97 | 98 | 97 | 99 | 98 | 96 | 95 | 97 |
| Contact Angle (°) | 105 | 104 | 108 | 108 | 110 | 109 | 106 | 102 | 100 |
| Color Diff. (ΔE) | 3.4 | 3.1 | 3.4 | 2.1 | 2.8 | 2.0 | 8.5 | 3.7 | 3.9 |

*HX: CORONATE HX (trade name) of polyisocyanate made by Nippon Polyurethane Industry Co., V1890E: isophorone diisocyanate based polyisocyanate of Hüls Co., TPLS2092: isophorone diisocyanate based blocked isocyanate of Sumitomo Bayer Urethane Co., DBTDL: dibutyltin dilaurate of Tokyo Kasei Co., and ADH: adipic acid dihydrazide of Otsuka Chemical Co., Ltd.

COMPARATIVE EXAMPLE 4

In this comparative example, 11 parts by weight of a hardener, CORONATE HX (trade name), was added to 100 parts by weight of a fluorine-containing commercial varnish, CEFRAL COAT A670X (trade name) made by Central Glass Company Limited, thereby to prepare a paint. This varnish contains 60 wt % of solid matter and is prepared by using CTFE as a main monomer. Then, the paint was applied to an aluminum plate in the same manner as that of Evalu- %) of vinyl pivalate, 101.3 g (20 mol %) of crotonic acid, 9.6 g of t-butyl peroxy pivalate made by Nippon Oil & Fats Co, and 341.9 g of butyl acetate. The gas atmosphere in the autoclave was replaced by nitrogen gas, and this operation was repeated three times. Then, 451.9 g (40 mol %) of HFIB was introduced into the autoclave. Then, the temperature in the autoclave was raised up to 55° C., and at this temperature polymerization reaction was carried out for 24 hr. The reaction liquid was taken out of the autoclave. Then, butyl acetate was added thereto to prepare a varnish by adjusting the concentration of the obtained fluorine-containing copolymer therein to 50 wt %. The chemical composition and analytical results of the copolymer (Copolymer E10) are shown in Table 4. The molecular weight shown in Table 4 is defined in the same manner as in Table 1.

EXAMPLES 11–19 AND 21

In these examples, Example 10 was repeated except that selective changes were made as shown in Table 4 in the kind and quantity of monomers for preparing the fluorine-containing copolymers E11–E19 and E21, respectively.

EXAMPLE 20

In this example, Example 10 was repeated except that selective changes were made as shown in Table 4 in the kind and quantity of monomers for preparing the fluorine-containing copolymer E20 and that the preparation of the varnish was slightly modified as follows. That is, to 100 parts by weight of the obtained varnish taken out of the autoclave, 60 parts by weight of butyl acetate was added. Then, isopropyl alcohol contained in the varnish was distilled off, using evaporator, thereby to obtain a varnish containing 50 wt % of the fluorine-containing copolymer dissolved in a solvent mixture of butyl acetate and xylene. This varnish was used in the after-mentioned evaluation tests.

TABLE 4

| | Fluorine-containing Copolymers | | | | | |
|---|---|---|---|---|---|---|
| | E10 | E11 | E12 | E13 | E14 | E15 |
| Charged Monomers (mol %) | | | | | | |
| HFIB | 40.0 | 30.0 | 27.6 | 30.0 | 30.0 | 31.4 |
| HFA | — | — | — | — | — | — |
| CTFE | — | — | — | — | — | — |
| VPv | 40.0 | — | — | 30.0 | 30.0 | 45.8 |
| V9 | — | 50.0 | 21.6 | — | — | — |
| CHVE | — | — | — | — | — | — |
| EGMAE | — | — | — | — | — | 22.8 |
| HBAE* | — | — | 10.3 | — | — | — |
| HEA | — | — | — | — | 5.0 | — |
| HBVE | — | — | — | — | — | — |
| ε-CAE | — | — | — | — | — | — |
| Crotonic Acid | 20.0 | — | — | — | — | — |
| AA | — | 20.0 | — | — | — | — |
| VAA | — | — | — | — | — | — |
| AGE* | — | — | 40.5 | — | — | — |
| GVE* | — | — | — | 40.0 | — | — |
| A200* | — | — | — | — | 85.0 | — |
| TMVS* | — | — | — | — | — | — |
| APTMS* | — | — | — | — | — | — |
| MPTMS* | — | — | — | — | — | — |
| Solvents (parts by wt) | | | | | | |
| BuAc | 40.0 | — | — | — | — | 50.0 |
| IPA | — | 60.0 | — | 60.0 | 30.0 | — |
| Xylene | — | — | 10.0 | — | 30.0 | — |
| Copolymer Characteristics | | | | | | |
| OH Value (mg KOH/g) | — | — | 60 | — | 24 | 48 |
| Acid Value (mg KOH/g) | 29 | 92 | — | — | — | — |
| Epoxy Equivalent (g/equiv.) | — | — | 980 | 340 | 360 | — |
| Molecular Weight | 22,000 | 2,400 | 1,700 | 5,000 | 4,900 | 5,500 |

TABLE 4-continued

| | Fluorine-containing Copolymers | | | | | |
|---|---|---|---|---|---|---|
| | E16 | E17 | E18 | E19 | E20 | E21 |
| Charged Monomers (mol %) | | | | | | |
| HFIB | 30.0 | 30.0 | — | — | 30.0 | — |
| HFA | — | — | 45.0 | 45.0 | — | 45.0 |
| CTFE | — | 5.0 | — | — | — | — |
| VPv | 30.0 | 30.0 | 40.0 | 35.0 | 40.0 | 35.0 |
| V9 | 25.0 | 10.0 | — | — | — | — |
| CHVE | — | 2.0 | — | — | — | — |
| EGMAE | 5.0 | 15.0 | — | — | — | — |
| HBAE* | — | — | — | — | — | — |
| HEA | — | — | — | — | — | — |
| HBVE | 10.0 | — | — | — | — | — |
| ε-CAE | — | 5.0 | — | — | — | — |
| Crotonic Acid | — | — | — | — | — | — |
| AA | — | — | — | — | — | — |
| VAA | — | 3.0 | — | — | — | — |
| AGE* | — | — | — | 20.0 | — | — |
| GVE* | — | — | — | — | — | — |
| A200* | — | — | — | — | — | — |
| TMVS* | — | — | 15.0 | — | — | — |
| APTMS* | — | — | — | — | 30.0 | — |
| MPTMS* | — | — | — | — | — | 20.0 |
| Solvents (parts by wt) | | | | | | |
| BuAc | 40.0 | 60.0 | 40.0 | 40.0 | — | 40.0 |
| IPA | — | — | — | — | 30.0 | — |
| Xylene | — | — | — | — | 30.0 | — |
| Copolymer Characteristics | | | | | | |
| OH Value (mg KOH/g) | 52 | 80 | — | — | — | — |
| Acid Value (mg KOH/g) | — | 15 | — | — | — | — |
| Epoxy Equivalent (g/equiv.) | — | — | — | — | — | — |
| Molecular Weight | 7,800 | 7,200 | 7,900 | 9,200 | 6,200 | 15,000 |

*HBAE: hydroxybutyl allyl ether, AGE: allyl glycidyl ether, A200: CYCLOMER A200 (trade name) of $CH_2$=CH—COO—$CH_2$—D made by DAICEL CHEMICAL INDUSTRIES, LTD., GVE: glycidyl vinyl ether, TMVS: trimethoxyvinylsilane, APTMS: 3-acryloxypropyltrimethoxysilane, and MPTMS: 3-methacryloxypropyltrimethoxysilane.

COMPARATIVE EXAMPLES 5–9

In these comparative examples, Example 10 was repeated except that selective changes were made as shown in Table 5 in the kind and quantity of monomers for preparing the fluorine-containing copolymers CE5–CE9.

TABLE 5

|  | Fluorine-containing Copolymers | | | | |
|---|---|---|---|---|---|
|  | CE5 | CE6 | CE7 | CE8 | CE9 |
| Charged Monomers (mol %) | | | | | |
| HFIB | — | — | — | 15.0 | 20.0 |
| CTFE | 44.8 | 28.6 | 49.6 | 15.0 | 20.0 |
| VPv | 28.2 | 22.4 | — | 45.0 | 40.0 |
| VBu | — | — | 15.5 | — | — |
| V9 | — | — | 15.5 | — | — |
| EGMAE | 10.0 | — | — | 25.0 | 20.0 |
| HBAE | — | 10.7 | 18.4 | — | — |
| Crotonic Acid | 17.0 | — | — | — | — |
| VAA | — | — | 1.0 | — | — |
| AGE | — | 38.3 | — | — | — |
| Solvents (parts by wt) | | | | | |
| BuAc | 30.0 | — | — | 50.0 | 50.0 |
| Xylene | — | 10.0 | 45.0 | — | — |
| Copolymer Characteristics | | | | | |
| OH Value (mg KOH/g) | 55 | 80 | 83 | 51 | 48 |
| Acid Value (mg KOH/g) | 114 | — | 5 | — | — |
| Epoxy Equivalent (g/equiv.) | — | 342 | — | — | — |
| Molecular Weight | 8,700 | 3,300 | 4,800 | 5,100 | 5,600 |

EVALUATION TESTS (2)

In each of Examples 10–21 and Comparative Examples 5–9, the following evaluation tests were conducted on the paint and the coated film. As shown in Table 6, the test samples 10–21 were prepared by using the fluorine-containing copolymers according to the present invention, and the comparative test samples 1–4 were prepared by using the fluorine-containing copolymers not according to the present invention. The results are shown in Table 6.

The paint was prepared by adding a hardener(s) in an amount shown in Table 6, per 100 parts by weight of the fluorine-containing copolymer, to the varnish obtained in each of Examples 10–21 and Comparative Examples 5–9. The thus obtained paint was applied to a steel plate. This steel plate had a thickness of 0.8 mm and was previously coated with another film of an acrylic melamine white paint. This another film had a thickness of 20 μm. The coated film was cured at a certain temperature for a certain period of time, as shown in Table 6, to prepare a test sample. The cured film of the test is sample had a thickness of about 40 μm.

In the surface energy determination test, the contact angles of water and ethylene glycol drops were measured. Then, the surface energy of the coated film was obtained from the results of this measurement, using the extended FORKES formula.

In the stain resistance test of the coated film, 1 g of a liquid containing 5 wt % of carbon black dispersed in ion-exchanged water was dropped on a portion of the coated film. Then, the coated film was dried at 70° C. for 3 hr. After that, the carbon black remaining on the portion thereof was washed off. Then, the color difference (WB) of this portion was measured. Then, the difference (ΔWB) between the color differences (WB) before and after the test was determined. This difference (ΔWB) was used for evaluating stain resistance of the coated film.

TABLE 6

|  | Test Samples | | | | | | | |
|---|---|---|---|---|---|---|---|---|
|  | 10 | 11 | 12 | 13 | 14 | 15 | 16 | 17 |
| Fluorine-containing Copolymers (parts by wt) | | | | | | | | |
| E10 | 60 | — | — | — | — | — | — | — |
| E11 | — | 40 | 40 | — | — | — | — | 40 |
| E12 | 40 | — | — | — | — | — | — | — |
| E13 | — | 60 | — | — | — | — | — | — |
| E14 | — | — | 60 | — | — | — | — | — |
| E15 | — | — | — | 100 | — | — | — | — |
| E16 | — | — | — | — | 100 | — | — | — |
| E17 | — | — | — | — | — | 100 | — | — |
| E18 | — | — | — | — | — | — | 100 | — |
| E19 | — | — | — | — | — | — | — | 60 |
| E20 | — | — | — | — | — | — | — | — |
| E21 | — | — | — | — | — | — | — | — |
| CE5 | — | — | — | — | — | — | — | — |
| CE6 | — | — | — | — | — | — | — | — |
| CE7 | — | — | — | — | — | — | — | — |
| CE8 | — | — | — | — | — | — | — | — |
| CE9 | — | — | — | — | — | — | — | — |
| Hardeners (parts by wt) | | | | | | | | |
| HX | — | — | — | — | 22 | — | — | — |
| TPLS2094 | — | — | — | 29 | — | — | — | — |
| V1890E | — | — | — | — | — | 42 | — | — |
| DBTDL | — | — | — | 1 | 0.1 | 0.05 | 3 | — |
| TBAB | 1 | 1 | 1 | — | — | — | — | 1 |
| EX411* | — | — | — | — | — | — | — | — |
| Cure Temp. (°C.) | 140 | 140 | 140 | 140 | 25 | 25 | 200 | 140 |
| Cure Time | 30 min | 30 min | 30 min | 60 min | 4 days | 4 days | 30 min | 30 min |
| Coated Film Characteristics | | | | | | | | |
| Water Drop Contact Angle (°) | 93 | 93 | 94 | 90 | 90 | 90 | 93 | 93 |
| Surface Energy (dyn/cm2) | 17.2 | 18.0 | 17.0 | 19.0 | 18.9 | 19.4 | 18.0 | 18.2 |
| Stain Res. (ΔWB) | 0.1 | 0.1 | 0.1 | 0.2 | 0.2 | 0.3 | 0.1 | 0.1 |

|  | Test Samples | | | | Comparative Test Samples | | | |
|---|---|---|---|---|---|---|---|---|
|  | 18 | 19 | 20 | 21 | 1 | 2 | 3 | 4 |
| Fluorine-containing Copolymers (parts by wt) | | | | | | | | |
| E10 | — | — | — | — | — | — | — | — |
| E11 | — | — | 30 | 70 | — | — | — | — |
| E12 | — | — | — | — | — | — | — | — |
| E13 | — | — | — | — | — | — | — | — |
| E14 | — | — | — | — | — | — | — | — |
| E15 | — | — | — | — | — | — | — | — |
| E16 | — | — | — | — | — | — | — | — |
| E17 | — | — | — | — | — | — | — | — |
| E18 | — | — | — | — | — | — | — | — |
| E19 | — | — | 60 | — | — | — | — | — |
| E20 | 100 | — | 10 | — | — | — | — | — |
| E21 | — | 100 | — | — | — | — | — | — |
| CE5 | — | — | — | — | 60 | — | — | — |
| CE6 | — | — | — | — | 40 | — | — | — |
| CE7 | — | — | — | — | — | 100 | — | — |
| CE8 | — | — | — | — | — | — | 100 | — |
| CE9 | — | — | — | — | — | — | — | 100 |

TABLE 6-continued

| Hardeners (parts by wt) | | | | | | | | |
|---|---|---|---|---|---|---|---|---|
| HX | — | — | — | — | — | 15 | 22 | 22 |
| TPLS2094 | — | — | — | — | — | — | — | — |
| V1890E | — | — | — | — | — | — | — | — |
| DBTDL | 1 | 1 | — | — | — | 0.1 | 0.1 | 0.1 |
| TBAB | — | — | 1 | 1 | 1 | — | — | — |
| EX411* | — | — | — | 30 | — | — | — | — |
| Cure Temp. (°C.) | 200 | 200 | 140 | 140 | 140 | 25 | 25 | 25 |
| Cure Time | 30 min | 30 min | 30 min | 30 min | 30 min | 4 days | 4 days | 4 days |
| Coated Film Characteristics | | | | | | | | |
| Water Drop Contact Angle (°) | 90 | 91 | 92 | 89 | 82 | 82 | 87 | 88 |
| Surface Energy (dyn/cm2) | 18.0 | 18.1 | 18.1 | 18.5 | 30.2 | 30.4 | 29.7 | 28.8 |
| Stain Res. (ΔWB) | 0.1 | 0.1 | 0.1 | 0.2 | 9.2 | 10.4 | 8.9 | 9.5 |

*EX411: DENACOL EX411 (trade name) which is polyglycidyl ether resin of Nagase Kasei Kogyo Co., TPLS2094: blocked isocyanate of Sumitomo Bayer Urethane Co., and TBAB: tetra-n-butyl ammonium bromide of Tokyo Kasei Co.

The entire disclosure of each of Japanese Patent Applications Nos. 8-78801 filed on Apr. 1, 1996, 8-145824 filed on Jun. 7, 1996, and 9-82870 filed on April 1, 1997, including specification, claims and summary is incorporated herein by reference in its entirety.

What is claimed is:

1. A curable fluorine-containing copolymer prepared by copolymerizing a monomer mixture, said monomer mixture being in an amount of 100 mol % in total and comprising:
    (a) 10–60 mol % of a first polymerizable monomer that is one of hexafluoroisobutene and hexafluoroacetone, each of which has one hexafluoroisopropylidene group;
    (1) 10–70 mol % of a fatty acid vinyl ester that is represented by a general formula of $CH_2$=CH—OC(=O) —$R^1$ where $R^1$ is one of an alkyl group and —$(CH_2)_m$—$R^2$—$(CH_2)_n$—H where $R^2$ is one of a cycloalkylene group and a divalent aromatic group, and m and n are respectively integers each ranging from 0 to 12, said alkyl group having a carbon atom number of from 1 to 22 and an optional branched chain, each of said cycloalkylene group and said divalent aromatic group having an optional substituent;
    (C) 1–60 mol % of a second polymerizable monomer that has a cross-linkable functional group and a polymerzable double bond, said cross-linkable functional group being one selected from the group consisting of carboxyl group, hydrolyzable organosilyl groups, epoxy groups, β-ketoester groups; and
    (d) 0–20 mol % of a third polymerizable monomer that is different from said first and second monomers and said fatty acid vinyl ester and is free of a cross-linkable functional group.

2. A copolymer according to claim 1, wherein said third monomer is free of a fluoroolefin having at least one fluorine atom substituted for at least one hydrogen atom of ethylene.

3. A copolymer according to claim 1, wherein said third monomer comprises a fluoroolefin having at least one fluorine atom substituted for at least one hydrogen atom of ethylene, said fluoroolefin being free of hexafluoroisopropylidene group, and wherein a molar ratio of said first monomer to said fluoroolefin is at least 1.5.

4. A copolymer according to claim 1, wherein said copolymer prepared by a solution polymerization has a molecular weight of from 1,000 to 50,000 and at least one of a hydroxyl value of from 0 to 200 mg KOH/g, an acid value of from 0 to 100 mg KOH/g, and an epoxy equivalent of from 250 to 1,000 g/equiv.

5. A copolymer according to claim 1, wherein said first monomer is said hexafluoroisobutene.

6. A copolymer according to claim 1, wherein said fatty acid vinyl ester has a molecular weight that is lower than 130.

7. A copolymer according to claim 1, wherein said second monomer has a group that contains said polymerizable double bond and is selected from the group consisting of methacryloyl group, acryloyl group, vinyl group, vinyloxy group, allyl group, allyloxy group, and crotoxy group.

8. A copolymer according to claim 1, wherein said cross-linkable functional group of said second monomer is said carboxyl group.

9. A copolymer according to claim 1, wherein said cross-linkable functional group of said second monomer is said epoxy group.

10. A copolymer according to claim 1, wherein said second monomer is one of a hydroxyalkylmethacrylate and a hydroxyalkylacrylate, each of which has a hydroxyalkyl group having a carbon atom number of from 1 to 10.

11. A copolymer according to claim 1, wherein said second monomer is an unsaturated carboxylic acid.

12. A copolymer according to claim 11, wherein said unsaturated carboxylic acid is one of vinylacetic acid and acrylic acid.

13. A copolymer according to claim 1, wherein said second monomer is one of ε-caprolactone modified vinyl ether and ε-caprolactone modified allyl ether.

14. A copolymer according to claim 1, wherein said second monomer is an allyl ether containing two hydroxyl groups in the molecule.

15. A copolymer according to claim 1, wherein said first monomer is in an amount of from 20 to 55 mol %.

16. A copolymer according to claim 1, wherein said copolymer has a molecular weight of from 1,000 to 8,000 and a hydroxyl value of from 40 to 150 mg KOH/g and is prepared by copolymerizing said monomer mixture comprising:
    (a) 35–55 mol % of said first monomer that is said hexafluoroisobutene;
    (b) 10–60 mol % of said fatty acid vinyl ester that has a molecular weight lower than 130; and
    (c) 1–55 mol % of said second monomer.

17. A copolymer according to claim 10, wherein said copolymer is prepared by a solution polymerization in a solvent containing at least 40 wt % of an alcohol.

18. A fluorine-containing coating composition comprising a copolymer according to claim 1, a hardener, and a solvent.

19. A fluorine-containing coating composition comprising a copolymer according to claim 1 and one member selected from the group consisting of epoxy hardeners, isocyanate hardeners, melamine resin hardeners, urea resin hardeners, polybasic acid hardeners, metal alkoxides, and chelate hardeners, and hydrazine compounds.

20. A curable fluorine-containing coating composition comprising a copolymer according to claim 1, wherein the cross-linkable functional group in the second polymerizable monomer is said epoxy group, and further comprising an additional copolymer according to claim 1, wherein the cross-linkable functional group in the second polymerizable monomer is said carboxyl group, and a solvent.

21. A curable fluorine-containing copolymer prepared by copolymerizing a monomer mixture, said monomer mixture being in an amount of 100% mol in total and comprising:
    (a) 10–60 mol % of a first polymerizable monomer that is one of hexafluoroisobutene and hexafluoroacetone, each of which has one hexafluoroisopropylidene group;

(b) 10–70 mol % of a fatty acid vinyl ester that is represented by a general formula of $CH_2=CH-OC(=O)-R^1$ where $R^1$ is one of an alkyl group and $-(CH_2)_m-R^2-(CH_2)_n-H$ where $R^2$ is one of a cycloalkylene group and a divalent aromatic group, and m and n are respectively integers each ranging from 0 to 12, said alkyl group having a carbon atom number of from 1 to 22 and an optional branched chain, each of said cycloalkylene group and said divalent aromatic group having an optional substituent;

(c) 1–60 mol % of a second polymerizable monomer that has a cross-linkable hydroxyl group and a polymerizable double bond; and (d) 0–20 mol % of a third polymerizable monomer that is different from said first and second monomers and said fatty acid vinyl ester and is free of a cross-linkable functional group, wherein said polymerizable monomer is represented by one of the following formulas (1), (2) and (3) and a formula of $CH(-CH_3)=CHCOO-(CH_2)_p-OH$ where p is an integer ranging from 2 to 10,

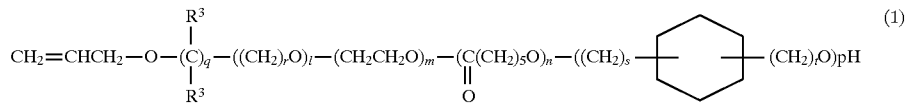

where $R^3$ represents the same or different alkyl groups each having a hydrogen or carbon atom number of from 1 to 3; l, p, q, s and t are integers each being 0 or 1; and r, m and n are integers each ranging from 0 to 12,

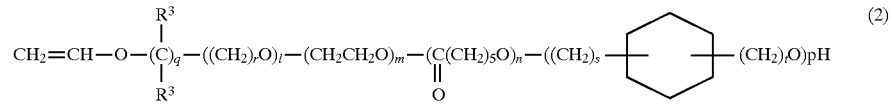

where $R^3$, l, p, q, s, t, r, m, and n are respectively defined as in the formula (1),

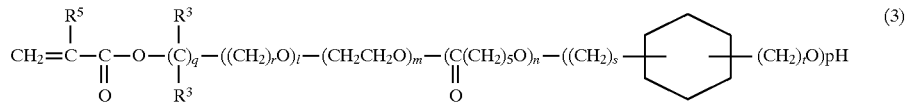

where $R^5$ is hydrogen atom or methyl group, and $R^3$, l, p, q, s, t, r, m, and n are respectively defined as in the formula (1).

22. A copolymer according to claim 21, wherein said second polymerizable monomer is represented by the formula (1).

23. A copolymer according to claim 21, wherein said second polymerizable monomer is represented by the formula (2).

24. A copolymer according to claim 21, wherein said second polymerizable monomer is represented by the formula (3).

25. A copolymer according to claim 21, wherein said second polymerizable monomer is represented by the formula of $CH(-CH_3)=CHCOO-(CH_2)_p-OH$.

* * * * *